United States Patent
Berry et al.

(10) Patent No.: US 9,796,849 B2
(45) Date of Patent: Oct. 24, 2017

(54) POLYURETHANE COMPOSITES COMPRISING NANOCRYSTALLINE CELLULOSE AND METHOD FOR IMPROVING PROPERTIES OF POLYURETHANES THEREOF

(71) Applicant: Celluforce Inc., Montreal (CA)

(72) Inventors: Richard Berry, Notre-Dame-de-L'lle Perrot (CA); Alain Granger, Saint-Jean-sur-Richelieu (CA)

(73) Assignee: Celluforce Inc., Montreal (CA)

( * ) Notice: Subject to any disclaimer, the term of this patent is extended or adjusted under 35 U.S.C. 154(b) by 0 days.

(21) Appl. No.: 14/894,052

(22) PCT Filed: May 22, 2014

(86) PCT No.: PCT/CA2014/050473
§ 371 (c)(1),
(2) Date: Nov. 25, 2015

(87) PCT Pub. No.: WO2014/190428
PCT Pub. Date: Dec. 4, 2014

(65) Prior Publication Data
US 2016/0108236 A1      Apr. 21, 2016

Related U.S. Application Data

(60) Provisional application No. 61/828,241, filed on May 29, 2013.

(51) Int. Cl.
| | |
|---|---|
| *C08L 75/08* | (2006.01) |
| *C08G 18/64* | (2006.01) |
| *C08G 18/76* | (2006.01) |
| *C08G 18/40* | (2006.01) |
| *C08L 1/02* | (2006.01) |
| *C08G 18/48* | (2006.01) |
| *C08G 101/00* | (2006.01) |

(52) U.S. Cl.
CPC .......... *C08L 75/08* (2013.01); *C08G 18/4081* (2013.01); *C08G 18/4829* (2013.01); *C08G 18/4841* (2013.01); *C08G 18/6484* (2013.01); *C08G 18/7621* (2013.01); *C08G 18/7671* (2013.01); *C08L 1/02* (2013.01); *C08G 2101/0008* (2013.01); *C08G 2101/0066* (2013.01); *C08G 2190/00* (2013.01); *C08G 2350/00* (2013.01); *C08G 2380/00* (2013.01); *C08K 2201/011* (2013.01)

(58) Field of Classification Search
CPC .................................. C08L 75/04; C08L 1/02
See application file for complete search history.

(56) References Cited

U.S. PATENT DOCUMENTS

2012/0088856 A1*   4/2012   Glos .................... C08G 18/42
                                                       521/112

OTHER PUBLICATIONS

Ramanen et al (The effect of drying method on the properties and nanoscale structure of cellulose whiskers, Cellulose (2012) 19:901-912).*
Lee et al (The susceptibility of never-dried and freeze-dried bacteria cellulose towards esterification with organic acid, Cellulose (2012) 19:891-900).*
International Search Report, Jul. 22, 2014, p. 1, Canadian Intellectual Property Office, Canada.
Li, Yang et al., "Rigid Polyurethane Foam/Cellulose Whisker Nanocomposites: Preparation, Characterization, and Properties", Journal of Nanoscience and NanoTechnology, Aug. 2011, pp. 6904-6911, vol. 11, No. 8, Amierican Scientific Publishers, United States.
Rueda, L. et al., "Isocyanate-rich cellulose nanocrystals and their selective insertion in elastomeric polyurethane", Composites Science and Technology. 2011, pp. 1953-1960, vol. 71. No. 16, Elsevier.
Patricio, Patricia Santiago De Oliviera et al., "Tailoring the morphology and properties of waterborne polyurethanes by the procedure of cellulose nanocrystal incorporation", European Polymer Journal, Dec. 2013, pp. 3761-3769, vol. 49, No. 12, Elsevier.
Cao, Xiaodong et al., "New Nanocomposite Materials Reinforced with Flax Cellulose Nanocrystals in Waterborne Polyurethane", BioMacromolecules, Feb. 22, 2007, pp. 899-904, vol. 8, No. 3, American Chemical Society, United States.
Auad, Maria L., et al., "Nanocomposites Made from Cellulose Nanocrystals and Tailored Segmented Polyurethanes", Journal of Applied Polymer Science, Sep. 15, 2009, pp. 1215-1225, vol. 115, No. 2, Wiley Periodicals, Inc.

* cited by examiner

*Primary Examiner* — Wenwen Cai
(74) *Attorney, Agent, or Firm* — Taft Stettinius & Hollister LLP

(57) ABSTRACT

A process for preparing polyurethane composites includes (i) providing a dispersion of nanocrystalline cellulose in (a) one or more polyols, (b) one or more isocyanates, or (c) one or more polyols and one or more isocyanate, mixed together; wherein the amount of water in the nanocrystalline cellulose is less than about 1% w/w; (ii) mixing the dispersion of (i)(a) with an isocyanate or (i)(b) with a polyol and a catalyst to allow polymerization; or mixing the dispersion of (i)(c) and a catalyst to allow polymerization; and (iii) isolating the polyurethane composite. A method for improving properties of polyurethanes includes dispersing nanocrystalline cellulose into one or both parts of a two part polyol/isocyanate precursors prior to allowing polymerization of the precursors, wherein the amount of water in the nanocrystalline cellulose is less than about 1% w/w; mixing the dispersion with a catalyst; and polymerizing the precursors to provide the polyurethane.

12 Claims, No Drawings

POLYURETHANE COMPOSITES COMPRISING NANOCRYSTALLINE CELLULOSE AND METHOD FOR IMPROVING PROPERTIES OF POLYURETHANES THEREOF

The present application is a U.S. National Phase of International PCT Application No. PCT/CA2014/050473, filed on May 22, 2014, which claims priority to U.S. Provisional Patent Application No. 61/828,241, filed on May 29, 2013. The contents of each of these applications are hereby incorporated herein by reference in their entireties.

BACKGROUND OF DISCLOSURE

Polyurethanes are formed by the reaction of polyols and isocyanates with an average of 2 or more functional groups per monomeric unit. The length of the segments between functional groups and the number of functional groups determine if the resulting polymer is flexible or rigid and the suitability of the polymer for making foam. These parameters also determine if the polymer is considered to be thermoset or thermoplastic. Chain extenders, crosslinkers, catalysts, and surfactants can be added to change these properties. Polyurethane applications can be classified as solid or foamed products with the latter being subdivided into foams that have different densities and different cell structures.

Nanocrystalline cellulose (NCC) is crystalline particle that have a high intrinsic strength, nanometric dimensions and a surface that is populated with hydroxyl groups; NCC are in essence nanoparticulate polyols. One example of cellulose nanocrystals is a sulphated cellulosic particle produced by sulphuric acid digestion of cellulose and being manufactured as CelluForce NCC™. The particles produced in this way are uniform and have an aspect ratio of about 20; the exact length and diameter of the particles are dependent upon the starting substrate and the process conditions that are used.

SUMMARY OF THE DISCLOSURE

In one aspect, there is provided a process for preparing a polyurethane composite comprising:
 (i) providing a dispersion of NCC in
  (a) one or more polyols,
  (b) one or more isocyanates, or
  (c) in one or more polyols and one or more isocyanate, separately of mixed together;
 (ii) mixing the dispersion of (i)(a) with an isocyanate or (i)(b) with a polyol and a catalyst to allow polymerization; or mixing the dispersion of (i)(c) and a catalyst to allow polymerization; and
 (iii) isolating said polyurethane composite.

In one aspect, there is provided a method for modulating at least one property of a polyurethane, said method comprising dispersing NCC into one or both parts of a two part polyol/isocyanate precursors prior to allowing polymerization of said precursors.

In a further aspect, there is provided a polyurethane composite prepared in accordance with the process as defined herein.

In still a further aspect, there is provided polyurethane composite comprising NCC.

In one aspect, there is provided an article prepared from the polyurethane composite comprising NCC as defined herein.

DETAILED DESCRIPTION

A new approach to changing the properties of polyurethanes is being made possible by the introduction of NCC to polyurethane formulations.

NCC can be incorporated at very small concentration into the polyol and/or into the isocyanate fractions of polyurethane formulations to achieve valuable modulations in properties of the polyurethane such as tensile strength and elongation in the polymerised polyurethane. It has been observed that the concentration of NCC in either the polyol or the isocyanate fraction and the dryness of the NCC can be factors for obtaining such modulation of properties.

For example, as will be described below the addition of certain amounts of NCC increased the elongation and tensile strength of solid polyurethane without changing the polyol or the isocyanate. It has been found that there is an optimum concentration which is significantly below (i.e. less than) 1% by weight and closer to (i.e. about) 0.1% by weight in the final polyurethane that allows for enhancement of elongation and tensile strength properties. At concentration higher than 1% the addition of the particle decreased the elongation and tensile strength of the polyurethane. These modulations of properties were in these cases also dependent on the NCC that is added being dry and well dispersed. It has further been found that the addition of the NCC to the isocyanate phase is more effective than it being added to the polyol phase when it was desired to enhance the elongation and tensile strength properties.

In certain embodiments, the amount of water in NCC is preferably less than about 5% w/w, preferably less than about 4%, less than about 3%, less than about 2%, or preferably less than about 1% w/w. In certain embodiments, the amount of water in NCC is 0% w/w (or NCC is essentially free of water). It is intended here that "0%" means about 0% in that essentially all of the water was removed by drying of the NCC, such as oven drying, at 110 C for a sufficient period to provide an essentially dry NCC.

The properties of a polyurethane can also be modulated by the types of isoyanates and polyols used, as well as the use of chain extenders, cross linkers and catalysts, however it is believed that the scope of isocyanates and polyols used in the invention is not limited.

The isocyanates useful to prepare polyurethanes are well known in the art. In one embodiment, the isocyanates for use in the present disclosure include aromatic and aliphatic (including cycloaliphatic) isocyanates. Isocyanates used herein to make polyurethane must have two or more isocyanate groups on each molecule. Polymeric diphenylmethane diisocyanates are also contemplated for use in the present disclosure.

Examples of aromatic isocyanates include diphenylmethane diisocyanate (MDI) or toluene diisocyanate (TDI).

Examples of aliphatic and cycloaliphatic isocyanates include 1,6-hexamethylene diisocyanate (HDI), 1-isocyanato-3-isocyanatomethyl-3,5,5-trimethyl-cyclohexane (isophorone diisocyanate, IPDI), and 4,4'-diisocyanato dicyclohexylmethane.

The polyols useful to prepare polyurethanes are well known in the art. In one embodiment, the polyols useful for use in the present disclosure include polyether polyols and polyester polyols.

Polyurethane catalysts useful to prepare polyurethanes are well known in the art. In one embodiment, the catalysts is an amine compounds or metal complexes.

Amine compounds catalysts include tertiary amines such as triethylenediamine (TEDA, 1,4-diazabicyclo[2.2.2]octane or DABCO), dimethylcyclohexylamine (DMCHA), and dimethylethanolamine (DMEA). Catalysts may also contain a hydroxyl group or secondary amines.

Examples of metallic compounds catalysts include those based on mercury, lead, tin, bismuth, and zinc such as mercury, bismuth and zinc carboxylates. Alkyl tin carboxylates, oxides and mercaptides oxides are used in polyurethane applications.

In accordance with one embodiment, NCC may be used in polyurethane composition comprising conventional chain extenders and cross linkers. Chain extenders and cross linkers are low molecular weight hydroxyl and amine containing compounds. Examples of chain extenders are ethylene glycol, 1,4-butanediol (1,4-BDO or BDO), 1,6-hexanediol, cyclohexane dimethanol and hydroquinone bis(2-hydroxyethyl) ether (HQEE).

In one embodiment, one or more additional agents may be included in the polyurethane composition. Examples include additional agent selected from viscosity modifier, foaming agents, fire retardants, coloring agents, fungicides and their mixture thereof.

In one embodiment, there is provided a process for preparing a polyurethane composite comprising:
(i) providing a dispersion of NCC in (a) one or more polyols;
(ii) mixing the dispersion of (i)(a) with an isocyanate and a catalyst to allow polymerization; and
(iii) isolating said polyurethane composite.

In one embodiment, there is provided a process for preparing a polyurethane composite comprising:
(i) providing a dispersion of NCC in (b) one or more isocyanates;
(ii) mixing the dispersion of (i)(b) with a polyol and a catalyst to allow polymerization; and
(iii) isolating said polyurethane composite.

In one embodiment, there is provided a process for preparing a polyurethane composite comprising:
(i) providing a dispersion of NCC in (a) one or more polyols or in (b) one or more isocyanates;
(ii) mixing the dispersion of (i)(a) with an isocyanate or the mixture of (i)(b) with a polyol; and a catalyst to allow polymerization; and
(iii) isolating said polyurethane composite.

In one embodiment, there is provided a process for preparing a polyurethane composite comprising:
(i) providing a dispersion of NCC in (c) in one or more polyols and one or more isocyanate, separately or mixed together;
(ii) mixing the dispersion of (i)(c) and a catalyst to allow polymerization; and
(iii) isolating said polyurethane composite.

The improvements provided by this disclosure will be valuable in the full range of polyurethanes which are used in elastomeric fibres, paints, solid polyurethane plastics thermoplastic and cast elastomers, and adhesives and binders. For example, polyurethanes are used in the manufacture of flexible, high-resilience foam seating; rigid foam insulation panels; microcellular foam seals and gaskets; durable elastomeric wheels and tires; automotive suspension bushings; electrical potting compounds; high performance adhesives; surface coatings and surface sealants; synthetic fibers; hard-plastic parts; hoses and skateboard wheels.

The composite resulting from the present invention provides modified/modulated physical and mechanical properties that may be achieve from an existing or novel isocyanate/polyol composition. In the following examples, it has been observed that the addition of a small amount of nanocrystalline cellulose improved one or more mechanical properties of the polyurethane. Other mechanical properties such as scratch resistance, abrasion resistance, hardness, impact resistance or a combination thereof may be modulated by the addition of nanocrystalline cellulose.

In optimizing/choosing the desired mechanical properties, it is possible that the higher range concentration of NCC described herein be used. For example, it is contemplated that more than 1% (e.g. 1-5%) NCC may be desirable to improve certain properties such as scratch resistance, abrasion resistance, hardness and/or impact resistance even if other properties (e.g. tensile strength and/or elongation) may be reduced compared to the NCC-free polyurethane.

The following examples are provided to further illustrate details for the preparation and use of the polyurethane composites. They are not intended to be limitations on the scope of the instant disclosure in any way, and they should not be so construed. Those skilled in the art will readily understand that known variations of the conditions and processes of the following preparative procedures can be used.

Unless otherwise specified, the chemicals, used as received. One of the polyurethane systems used was Gyftane D62100 and P7010 were obtained from Plastique GYF. NCC is prepared by CelluForce™ by sulfuric acid hydrolysis of kraft bleached softwood pulp. The NCC that is delivered has a nominal amount of about 5% water associated with it. The water content is then normally measured by oven drying of the NCC (e.g. in an oven at 110 C) and measuring the weight difference NCC. Hyperlite™ E-824 is a 5,000-molecular-weight polyoxyalkylene polyol produced by Bayer Material Science. Mondur 445 is a toluene diisocyanate (TDI) polymeric diphenylmethane diisocyanate (MDI) blend. The catalyst used with the Mondur™ 445/Hyperlite™ E-824 system is a mixture of triethylene diamine in dipropylene glycol.

EXAMPLE 1

Stability of Dispersion

The first experiments determined the point at which a stable dispersed suspension of NCC in either the polyol or isocyanate phase could be achieved. With the particular polyol chosen, Table I shows that a stable suspension was obtained at a concentration of approximately 0.1% by weight in the polyol phase. The test used for this example was that dispersions were considered stable when there was no visible precipitation of NCC from the suspension. The dispersion is prepared by mixing at 800 rpm for 60 to 70 minutes in a planetary centrifugal mixer.

TABLE I

The stability of the NCC suspension over a 24 hour period at room temperature using Bayer Hyperlite E-824

| Polyol, weight % | NCC, weight % | Stable over 24 hours |
|---|---|---|
| 60 | 40 | No |
| 80 | 20 | No |
| 99 | 1 | No |
| 99.5 | 0.5 | No |
| 99.9 | 0.1 | Yes |

EXAMPLE 2

Elongation and Tensile Strength

Table II shows that when dry NCC is added to the polyol phase that the resulting polyurethane has higher elongation and higher tensile strength than does the control without NCC but also when larger quantities of dry NCC are added into the polyol phase. The test that was used is ASTM D-638. These results along with those in Table I indicate that it is important to form a suspension in the polyol where the nanoparticles are fully dispersed and not aggregated.

TABLE II

The increase in tensile strength and elongation in the formulation when NCC with 0% moisture is added to the polyol phase in Gyftane.

| NCC, weight % | Elongation, % | Tensile strength, psi |
|---|---|---|
| 0 | 1160 | 1083 |
| 0.2 | 1218 | 1179 |
| 2 | 928 | 1024 |

Table III shows the same results are obtained with a different polyol (Hyperlite E824) isocyanate (Mondur 445) combination. The choice of charges in this example shows that the advantage is again obtained at a low charge of NCC with the optimum in this case being at ~0.1% when the NCC is added to the polyol phase.

TABLE III

The increase in tensile strength and elongation in the formulation when NCC with 0% moisture is added to the polyol phase.

| NCC, weight % | Elongation, % | Tensile strength, psi |
|---|---|---|
| 0 | 175 | 149 |
| 0.05 | 205 | 165 |
| 0.09 | 280 | 225 |
| 0.185 | 252 | 203 |

EXAMPLE 3

Elongation and Tensile Strength

Table IV shows that when dry NCC is added to the isocyanate phase that again the resulting polyurethane has higher elongation and higher tensile strength than does the control without NCC and again when larger quantities of dry NCC are added into the polyol phase. These results along with those in Table I indicate that it is important to form a suspension in the polyol where the nanoparticles are fully dispersed and not aggregated.

TABLE IV

The increase in tensile strength and elongation in the formulation when NCC with 0% moisture is added to the isocyanate phase (Gyftane).

| NCC, weight % | Elongation, % | Tensile strength, psi |
|---|---|---|
| 0 | 1160 | 1083 |
| 0.2 | 1475 | 1349 |
| 0.5 | 1244 | 1193 |
| 2 | 1012 | 1027 |
| 4 | 1019 | 1016 |
| 10 | 1090 | 938 |

Table V shows the same results are obtained with a different polyol (Hyperlite E824) isocyanate (Mondur 445) combination. The choice of charges in this example shows that the advantage is again obtained at a low charge of NCC with the optimum in this case being at ~0.05 when the NCC is added to the isocyanate phase.

TABLE V

The increase in tensile strength and elongation in the formulation when NCC with 0% moisture is added to the isocyanate phase.

| NCC, weight % | Elongation, % | Tensile strength, psi |
|---|---|---|
| 0 | 175 | 149 |
| 0.05 | 262 | 204 |
| 0.09 | 213 | 193 |
| 0.185 | 198 | 164 |

This improvement that is obtained by adding dry NCC to the isocyanate phase over the polyol phase is directly shown in Tables VI and VII.

TABLE VI

Comparison of the effectiveness of adding NCC with 0% moisture to the isocyanate phase rather than the polyol phase.

| NCC, weight % | Elongation, % | Tensile strength, psi |
|---|---|---|
| 0.2 (in isocyanate) | 1475 | 1349 |
| 0.2 (in polyol) | 1218 | 1179 |

TABLE VII

Comparison of the effectiveness of adding NCC with 0% moisture to the isocyanate phase rather than the polyol phase.*

| NCC, weight % | Elongation, % | Tensile strength, psi |
|---|---|---|
| 0.05 (in isocyanate) | 262 | 204 |
| 0.09 (in polyol) | 280 | 225 |

*Polyol (Hyperlite E824)/isocyanate (Mondur 445) combination

With the polyol—isocyanate combination in the example shown in Table VII, there is a different optimum NCC charge but the effectiveness per weight unit of NCC is greater when it was added to the isocyanate phase.

EXAMPLE 4

Elongation and Tensile Strength (5% Moisture)

The importance of the removal of water is seen in Table VIII where there is significant variability and in general significant decreases in the physical strength parameters measured with this polyurethane formulation. In this example, the NCC was added to the isocyanate phase.

TABLE VIII

The limited effect of increasing the concentration of NCC in
the formulation on tensile strength and elongation
when the NCC has 5% moisture

| NCC, weight % | Elongation, % | Tensile strength, psi |
|---|---|---|
| 0 | 1160 | 1083 |
| 0.5 | 1032 | 1248 |
| 2 | 811 | 933 |
| 5 | 1257 | 981 |

While the disclosure has been described in connection with specific embodiments thereof, it is understood that it is capable of further modifications and that this application is intended to cover any variation, use, or adaptation of the disclosure following, in general, the principles of the disclosure and including such departures from the present disclosure that come within known, or customary practice within the art to which the disclosure pertains and as may be applied to the essential features hereinbefore set forth, and as follows in the scope of the appended claims

The invention claimed is:

1. A process for preparing a polyurethane composite comprising:
   (i) providing a dispersion by
      (a) dispersing nanocrystalline cellulose into one or more polyols,
      (b) dispersing nanocrystalline cellulose into one or more isocyanates, or
      (c) dispersing nanocrystalline cellulose into one or more polyols and one or more isocyanates, separately or mixed together;
   (ii) mixing the dispersion of (a) with an isocyanate and a catalyst, mixing the dispersion of (b) with a polyol and a catalyst, or mixing the dispersion of (c) with a catalyst, to allow polymerization; and
   (iii) isolating said polyurethane composite,
      wherein the amount of water in said nanocrystalline cellulose is less than about 1% w/w.

2. The process of claim 1, wherein the isocyanate is an aromatic isocyanate.

3. The process of claim 1, wherein the isocyanate is an aliphatic isocyanate.

4. The process of claim 1, wherein the isocyanate is selected from the group consisting of a polymeric diphenylmethane diisocyanates, diphenylmethane diisocyanate (MDI), toluene diisocyanate (TDI); 1,6-hexamethylene diisocyanate (HDI), 1-isocyanato-3-isocyanatomethyl-3,5,5-trimethyl-cyclohexane (IPDI), 4,4'-diisocyanato dicyclohexylmethane; and a mixture thereof.

5. The process of claim 1, wherein the polyol for use in the process is comprising polyether polyols and polyester polyols.

6. The process of claim 1, wherein the catalysts is an amine compound or metal complex.

7. The process of claim 1, wherein the amount of nanocrystalline cellulose in said polyurethane composite is less than about 5% w/w.

8. The process of claim 1, wherein the amount of nanocrystalline cellulose in said polyurethane composite is less than about 1% w/w.

9. A method for modulating at least one property of a polyurethane, said method comprising:
   (i) providing a dispersion by
      (a) dispersing nanocrystalline cellulose into a polyol,
      (b) dispersing nanocrystalline cellulose into an isocyanate, or
      (c) dispersing nanocrystalline cellulose into a polyol and an isocyanate,
   (ii) mixing the dispersion of (a) with an isocyanate and a catalyst, mixing the dispersion of (b) with a polyol and a catalyst, or mixing the dispersion of (c) with a catalyst, to form a mixture; and
   (iii) polymerizing said mixture to provide said polyurethane,
      wherein the amount of water in said nanocrystalline cellulose is less than about 1% w/w.

10. The method of claim 9, wherein said property is one or more mechanical properties of the polyurethane selected from the group consisting of enhancement of elongation and tensile strength properties.

11. The method of claim 9 wherein said property is one or more mechanical properties selected from the group consisting of scratch resistance, abrasion resistance, hardness, impact resistance and a combination thereof.

12. The method of claim 9, wherein said polyurethane is a polyurethane which is used in elastomeric fibres, paints, solid polyurethane plastics thermoplastic and cast elastomers, adhesives and/or binders.

* * * * *